United States Patent [19]

Sinko

[11] Patent Number: 5,176,894
[45] Date of Patent: Jan. 5, 1993

[54] PROCESS FOR MAKING IMPROVED CORROSION PREVENTIVE ZINC CYANAMIDE

[75] Inventor: John Sinko, Glendale, Wis.

[73] Assignee: Wayne Pigment Corp., Milwaukee, Wis.

[21] Appl. No.: 802,855

[22] Filed: Dec. 6, 1991

[51] Int. Cl.⁵ ............................................. C01C 03/16
[52] U.S. Cl. ................................. 423/368; 106/419
[58] Field of Search ............................................ 423/368

[56] References Cited

U.S. PATENT DOCUMENTS

| | | |
|---|---|---|
| 1,745,753 | 2/1930 | Franck et al. ............ 423/368 |
| 1,948,106 | 2/1934 | Franck ........................ 423/368 |
| 3,039,848 | 6/1962 | Schaus ........................ 423/368 |
| 4,305,979 | 12/1981 | Isarai et al. . |
| 4,707,405 | 11/1987 | Evans et al. . |
| 5,009,935 | 4/1991 | Waddington et al. . |

FOREIGN PATENT DOCUMENTS 327783  4/1972  U.S.S.R. ............................ 423/368
905959  9/1962  United Kingdom .

Primary Examiner—Wayne Langel
Attorney, Agent, or Firm—Fuller, Ryan, Hohenfeldt & Kees

[57] ABSTRACT

Improved corrosion preventive pigment grade zinc cyanamide suitable for protective mirror backing coating is prepared by reacting a totally hydrated zinc oxide slurry with hydrogen cyanamide. The reaction is carried out while maintaining a stoichiometric excess of zinc oxide at an elevated temperature between about 75° C. and about 85° C. The reaction mixture is provided in a condition free of inorganic soluble salts and free of anions containing sulfur such as sulfides or sulfates.

4 Claims, No Drawings

333
PROCESS FOR MAKING IMPROVED CORROSION PREVENTIVE ZINC CYANAMIDE

FIELD OF THE INVENTION

The present invention relates to a process for preparing zinc cyanamide. More specifically, the invention relates to a process which provides pigment grade zinc cyanamide of improved quality suitable for use as a corrosion retardant component in protective paints such as those used for mirror backing.

BACKGROUND ART

Zinc cyanamide has previously been produced by reacting calcium cyanamide (which contains approximately 1% CaS) with sulfuric acid or carbon dioxide and subsequently reacting the resultant aqueous solution of hydrogen cyanamide with a zinc oxide slurry at ambient temperatures such as 20° C. for one to two hours. See, for example, Italian Patent No. 612539/1959 or British Patent No. 905957 (1962). This process is reported to produce a pigment grade product that contains 83%-85% zinc cyanamide. Unfortunately, the prior art processes require extensive washing in an effort to remove soluble inorganic salt contaminants. The products are generally not suitable corrosion inhibitors for mirror backing coatings because the soluble inorganic salt impurities, even when present in trace amounts, act as corrosion promoters. This is particularly true of soluble sulfide or sulfate contaminants present in protective paints and coatings used for protecting silver coated mirrors. Thus, although zinc cyanamide has been suggested as a corrosion preventive ingredient in mirror backing coatings (see for example U.S. Pat. No. 4,707,403 issued Nov. 17, 1987), it has never gained commercial acceptance for such applications. It now appears that because such available products hold considerable amounts of $Ca^{2+}$ and $SO_4^{2-}$ as well as $S^{2-}$ containing soluble impurities, zinc cyanamides heretofore available have not been effective in mirror backing protective paint and coating formulations.

Zinc cyanamide functions as a corrosive preventive component of protective coatings and, more specifically, of mirror backing coatings due to its optimal water solubility and hydrolysis pH; however, it is reasonable to suppose that the product's $H_2S$ scavenging capacity and specifically, the anti-oxidant nature of the cyanamide moiety, generated by solubilization during the pigment's interaction with corrosion promoting processes, are primarily accountable for its protective activity.

It is known that the reflective silver layer of mirrors (even protected by "backing" coatings) is extremely sensitive to the presence and corrosive action of the airborne salt particles (common in coastal regions) or acidic species and $H_2S$ which are commonly present in industrial or domestic environments, respectively. Evidently, the above-mentioned various airborne contaminants promote oxidative processes on silver, which occur according to the scheme $Ag^\circ \rightleftharpoons Ag^+$ and result in the well known and undesirable phenomena, the corrosive destruction of mirrors' reflective layers. In this respect, it is interesting to note that chromates, zinc phosphate or zinc salts of dicarboxilic acids, commonly applied as a corrosion inhibiting additive to protective primers for steel or aluminum surfaces, contrary to all expectation, actually exhibit corrosive action on thin silver layers and attempts made to employ them in mirror backing applications were unsuccessful. It can be stated, that due to the above-mentioned sensitivity, mirrors' reflective silver layers are quite intolerant to quality variations of raw materials employed in mirror backing protective coatings. Such quality variations of pigment grade products are often caused by the presence of soluble inorganic contaminants, usually in trace amounts (i.e. water soluble by-products of the manufacturing procedures) or by low values of the products' specific surface area and, consequently, of their solubility rate typical for calcined grades.

There are also known manufacturing procedures in which zinc cyanamide is prepared by treating ZnO with excess urea or dicyandiamide, under $N_2$ or vacuum, initially at 135°-200° C. and by calcining it subsequently at 600°-800° C. for two hours. The shortcoming of the above-mentioned energy intensive procedures is that they yield products of relatively "closed" texture, characterized by low value of specific surface area and porosity. Zinc cyanamide produced by calcination does not exhibit the highest possible degree of corrosion preventive activity necessary in mirror backing systems.

DETAILED DESCRIPTION

The objects and advantages are achieved according to the procedure subsequently described in detail by reacting, at an elevated temperature of about 75° to 85° C., an inorganic soluble salt free, stabilized aqueous solution of hydrogen cyanamide with highly reactive completely dispersed and hydrated aqueous suspension of high grade zinc oxide and converting it with high yield to a soluble salt free zinc cyanamide suspension.

As raw materials, a stabilized aqueous solution of 50% hydrogen cyanamide and highly reactive totally dispersible high quality grade of zinc oxide are preferably used. The direct conversion of ZnO into zinc cyanamide pursuant to the procedure subsequently described is a diffusion controlled heterogen process which occurs at the ZnO-liquid interface. In that respect it is observed that to obtain the desired final products, thorough dispersion and total hydration of the ZnO, prior to reaction with hydrogen cyanamide, is essential.

The compositions of the present invention provide improved coatings for protection of thin metal films such as silver particularly when used as an additive in conventional mirror backing coatings. Such coating compositions incorporating the zinc cyanamide produced according to the present invention are based on organic resin polymers such as alkyd resins, polyurethane resins, acrylic resins or epoxy resins and the like. Such resins are generally compounded in a suitable solvent or carried as a film forming dispersion in a latex paint composition. The compositions of this invention are incorporated into such conventional coating formulations in minor amounts.

The starting materials for the process of the present invention include an aqueous solution of hydrogen cyanamide ($H_2NCN$) preferably in the form of a 50% aqueous solution. The solution preferably has less than 50 parts per million of metal impurities and is substantially free of soluble electrolyte type of inorganic salts. By "substantially free" as the term is used herein is meant less than about 100 parts per million of such materials are present. Soluble but non-electrolyte type products, such as urea, are tolerable as impurities. One suitable starting material, a 50% aqueous solution of hydrogen cyanamide, is available commercially under the trade name CYANAMIDE-50 sold by Cyanamide Canada, Inc.

The other principal ingredient for preparation of compositions of this invention is a pigment grade finely divided and highly purified zinc oxide. The zinc oxide should also be substantially free of sulfur containing compounds and substantially free of soluble inorganic salts and consequently, such grades of zinc oxide have an extremely low water soluble content. One commercially available suitable starting material is sold by American Smelting and Refining Company under the trade name AZO-66. This material is available commercially with an average particle size of 0.25 microns and has less than 0.03% water soluble salts and less than 0.01% sulfur content.

The direct conversion of finely divided zinc oxide into zinc cyanamide pursuant to the invention is a diffusion controlled heterogen process which occurs at the ZnO-liquid interface. Thus, it is important that perfect dispersion and total hydration of the ZnO prior to reaction with hydrogen cyanamide be obtained.

In order to minimize the presence of ZnO inclusions in the final product, the preparation of ZnO slurry is preferably performed by stirring at high speed for one hour at approximately 80° to 85° C. This can be accomplished, for example, in a drill press equipped with a two inch diameter Cowles blade at 2300 rpm, or by using any other dispersing equipment with similar or better performance known in the art, i.e. the MANTON-GAULIN homogenizer. It is preferred that a solid liquid ratio of 1:5 be utilized, as it is found then under these conditions a fluid and totally hydrated and dispersed highly reactive ZnO suspension is obtained.

Also, for the foregoing reasons, the reaction is preferably performed by slowly introducing, over a period of approximately 60 to 120 but preferably 60 to 70 minutes, the aqueous solution of hydrogen cyanamide kept at ambient temperatures, into the intensively stirred and previously prepared ZnO slurry which is kept at 60° to 85° C. and preferably in the temperature range of 75° to 85° C. Under such conditions a temporary stoichiometric excess of ZnO is insured all during the completion of the reaction. This procedure is essential to minimize the decomposition of unreacted hydrogen cyanamide temporarily present in the reaction mixture.

Similar conditions can be also realized by simultaneous delivery into the reaction mixture of the hydrogen cyanamide solution and the previously prepared ZnO slurry kept at the elevated temperatures of 75° to 85° C. In this case it is also important to maintain a temporary relative stoichiometric excess of ZnO and to maintain the intensive stirring of the reaction mixture at the aforementioned elevated temperatures. The foregoing description of the invention is illustrative and relates to preferred embodiments of the invention. It will be, however, apparent to those skilled in the art that various changes in the size and shape of the materials or substitutions of materials can be made within the scope of the appended claims and without departing from the spirit of the invention.

The invention will be further set forth by means of the following examples, wherein all parts are given by weight unless otherwise indicated.

EXAMPLE 1

Highly reactive, completely dispersed and hydrated suspensions of ZnO was prepared by introducing, in small increments, 1 mole (81.4 g) of Azo 66 grade ZnO into 400 ml of hot water stirred at high speed (drill press equipped with 2" diameter Cowles Blade at 2300 rpm was used). The dispersion and hydration process of suspended ZnO was completed by keeping the same conditions for two hours at 75°-85° C.

Pigment grade zinc cyanamide of improved quality was produced by introducing in 70-80 minutes into the intensively stirred ZnO slurry, kept at 75°-85° C., 1.1 moles (92.4 g) of hydrogen cyanamide as 50% stabilized aqueous solution, kept at normal temperature. Cyanamide-50 commercialized by Cyanamide Canada Inc. was used. The reaction was completed by maintaining the same conditions (intensive stirring and 75°-85° C.) for two hours after the hydrogen cyanamide introduction was finished. Subsequently, the resulted white precipitate was separated by vacuum filtration, the presscake, obtained at approximately 50% solid content, was washed under vacuum, with 50 ml of water at normal temperature, dried at $100° \pm 5°$ C. for 12 hours and pulverized in a laboratory grinder to fineness of 100% +230 mesh.

A total amount of approximately 350 ml of mother liquor and wash water was recovered by filtration and integrally re-introduced into the subsequent example of embodiment of the procedure. Total amount of final product recovered was 111 g.

EXAMPLE 2

Pigment grade zinc cyanamide was prepared following exactly the procedure described in Example 1, except that the amount of approximately 350 ml of mother liquor and wash water, recovered from the process performed pursuant to Example 1, was integrally re-introduced into the system completed with water to 400 ml and employed for ZnO slurry preparation. The total amount of dried pigment grade product, mother liquor and wash water recovered was 112 g and 350-360 ml, respectively.

Analytical data typical for pigment grade zinc cyanamide produced according to the above described procedure is presented subsequently:

| Analyzed or Tested Parameter | Found Value | Test Procedure Applied |
| --- | --- | --- |
| Zinc as Zn % | 57.7-58.3 | Complexomery |
| N as N % | 24.7-24.9 | Kjeldahl |
| Zinc Cyanamide, % | 93-94 | Calculated from N % and Zn % |
| Crystal Water, % | 5-6% | By weight lost at 400° C. |
| C Content | Undetermined | — |
| Conductivity (micro mhos/cm) | 700-1100 | ASTM D-281-31 |
| pH | 8.0-9.3 | ASTM D-1208-84/6.1.1 |
| Specific Gravity | 2.88 | ASTM D-153-84 |
| Oil Absorption (lbs/100 lbs) | 38-40 | ASTM D-281-31 |

What is claimed is:

1. A process for producing pigment grade zinc cyanamide having enhanced corrosion preventive activity comprising
   providing an aqueous mixture of finely divided zinc oxide substantially free of soluble inorganic salts and substantially free of materials having sulfur containing anions,
   totally hydrating said mixture by high speed stirring at approximately 75° to 85° C.

mixing with said resultant slurry a stabilized soluble aqueous solution of hydrogen cyanamide free of soluble inorganic salts and free of material having sulfur containing anions, and reacting said materials at a temperature between about 75° and 85° C.

2. A process according to claim 1 wherein the resultant zinc cyanamide is separated from the aqueous liquid.

3. A process according to claim 2 wherein the separated aqueous phase is reintroduced into a subsequent zinc oxide slurry preparation step.

4. A process according to claim 1 wherein a stoichiometric excess of dispersed zinc oxide is maintained during the conversion reaction in the reaction mixture.

* * * * *